United States Patent [19]
Ellinthorpe

[11] Patent Number: 5,924,648
[45] Date of Patent: Jul. 20, 1999

[54] SYSTEM FOR UPENDING/RECLINING LAUNCH VEHICLES

[75] Inventor: James William Ellinthorpe, Littleton, Colo.

[73] Assignee: Lockheed Martin Corporation, Bethesda, Md.

[21] Appl. No.: 08/943,454

[22] Filed: Oct. 3, 1997

[51] Int. Cl.$^6$ .............................. B64F 1/04; F41A 9/00; F41F 3/04
[52] U.S. Cl. ..................... 244/63; 89/1.802; 89/1.804; 89/1.805; 89/1.815
[58] Field of Search ................... 244/158 R, 63, 244/116; 89/1.802, 1.804, 1.805, 1.815; 414/680, 743, 783

[56] References Cited

U.S. PATENT DOCUMENTS

| | | |
|---|---|---|
| H1082 | 8/1992 | Andrew . |
| 2,604,045 | 7/1952 | Arnold . |
| 2,922,602 | 1/1960 | Mathaisel et al. ............... 244/63 |
| 2,926,798 | 3/1960 | Hamilton ..................... 89/1.815 |
| 2,949,823 | 8/1960 | Ross et al. ................... 89/1.815 |
| 2,968,410 | 1/1961 | Hamilton et al. ............ 89/1.805 X |
| 2,981,152 | 4/1961 | Miller, Jr. et al. . |
| 2,987,964 | 6/1961 | Logan et al. ................ 89/1.815 |
| 3,106,864 | 10/1963 | Seedlock et al. ........... 89/1.815 X |
| 3,160,289 | 12/1964 | Leefer ....................... 89/1.805 X |
| 3,199,455 | 8/1965 | Samms . |
| 3,284,888 | 11/1966 | McLain et al. . |
| 3,357,356 | 12/1967 | Bischoff . |
| 3,362,290 | 1/1968 | Carr et al. . |
| 3,453,960 | 7/1969 | Qualls . |
| 3,825,211 | 7/1974 | Minovitch . |
| 3,832,932 | 9/1974 | Even, deceased et al. ...... 89/1.815 X |
| 4,573,396 | 3/1986 | Strretman et al. ........... 89/1.815 X |
| 4,741,502 | 5/1988 | Rosen . |
| 4,796,839 | 1/1989 | Davis . |
| 4,867,357 | 9/1989 | Inglis et al. . |
| 4,932,607 | 6/1990 | Layton et al. ................ 244/63 |
| 4,964,340 | 10/1990 | Daniels et al. . |
| 5,046,426 | 9/1991 | Julien et al. . |
| 5,072,896 | 12/1991 | McIntyre et al. . |
| 5,104,067 | 4/1992 | McIntyre et al. . |
| 5,117,758 | 6/1992 | Renzi . |
| 5,129,602 | 7/1992 | Leonard . |
| 5,141,181 | 8/1992 | Leonard . |
| 5,143,328 | 9/1992 | Leonard . |
| 5,167,386 | 12/1992 | Laquer et al. . |
| 5,172,875 | 12/1992 | Fried . |
| 5,203,844 | 4/1993 | Leonard . |
| 5,217,188 | 6/1993 | Thole et al. ................... 244/63 X |
| 5,228,642 | 7/1993 | Bright . |
| 5,263,666 | 11/1993 | Hubert et al. . |
| 5,279,484 | 1/1994 | Zimmermann et al. . |
| 5,294,078 | 3/1994 | Gurr ............................. 244/63 X |
| 5,344,104 | 9/1994 | Homer et al. . |
| 5,518,209 | 5/1996 | Chicoine et al. . |
| 5,529,264 | 6/1996 | Bedegrew et al. . |

FOREIGN PATENT DOCUMENTS 1044780  10/1966  United Kingdom .

OTHER PUBLICATIONS

AIAA, International Reference Guide to Space Launch Systems, Ariane Operations, 1991, pp. 27–47.

*Primary Examiner*—Charles T. Jordan
*Assistant Examiner*—Theresa M. Wesson
*Attorney, Agent, or Firm*—Holme Roberts & Owen LLP

[57] ABSTRACT

An improved system is disclosed for upending/reclining an extraterrestrial vehicle. In one embodiment, first and second trunnion supports may be positioned on opposing sides of a u-shaped opening provided at the rearward end of a mobile support platform. A launch vehicle may be pivotably supported via trunnions received by the first and second trunnion supports for pivotal movement between a reclined position on top of the support platform to an upended position. In the upended position a launch vehicle will extend through the u-shaped opening. A bridge assembly may be selectively interconnected to the launch vehicle to facilitate handling, transport and storage therewith.

25 Claims, 11 Drawing Sheets

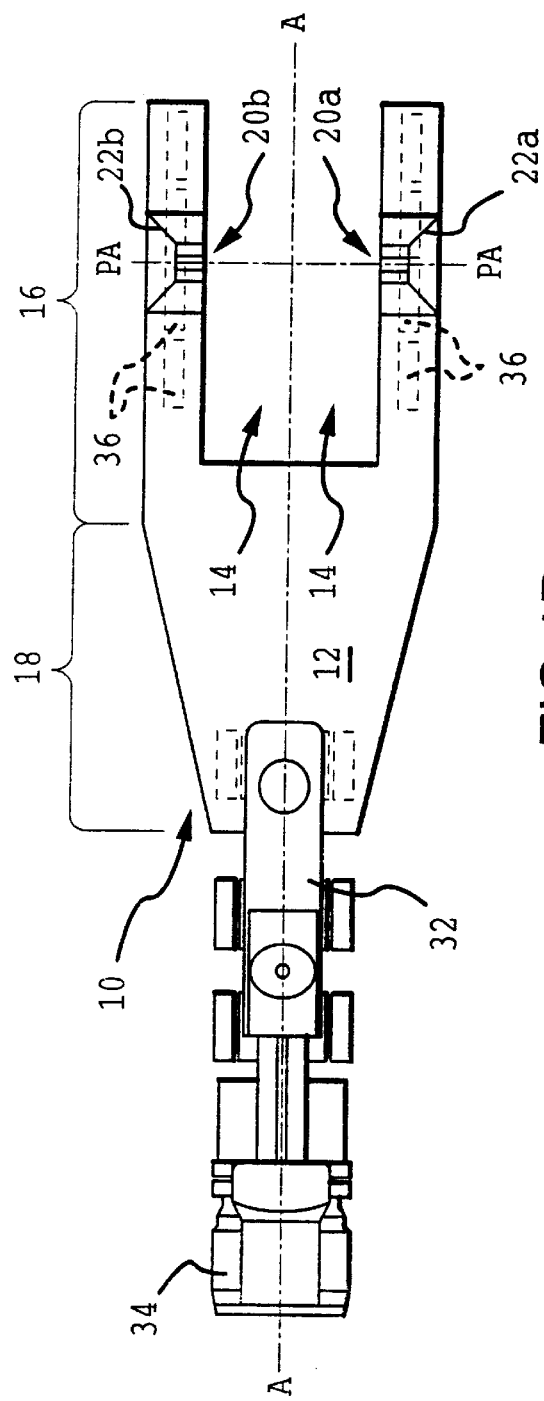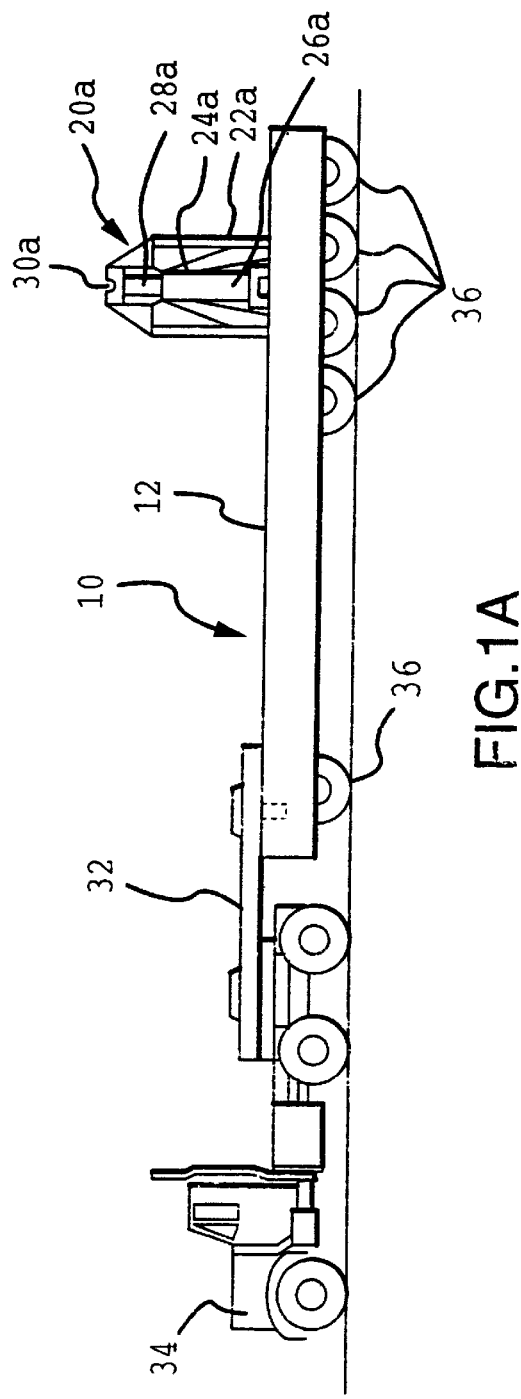

SYSTEM FOR UPENDING/RECLINING LAUNCH VEHICLES

FIELD OF THE INVENTION

The present invention relates to a system for upending/reclining extraterrestrial vehicles for launching, assembly, storage and/or transport purposes. More particularly, the invention pertains to an apparatus/method for readily translating a launch vehicle (e.g. for satellite placement) from a reclined to upright position, and vice versa, via pivotal movement of the launch vehicle on and relative to a support platform.

BACKGROUND OF THE INVENTION

The nature and extent of use of extraterrestrial vehicles is evolving at a rapid pace. In particular, the use of launch vehicles to position communication and other data transfer satellites into earth-based orbits is of current significance.

Indeed, the proliferation of competing data transfer satellite constellations is expected to continue well into the twenty-first century as such systems are increasingly utilized for commercial, personal and government purposes. These constellations and associated service networks provide for not only rapid, point-to-point communications and data transfer, they also avoid the burdensome need for "hard-wire" installation and significant material/labor expenses associated therewith. In this regard, virtually-seamless, transcontinental communication services are already becoming economically practical.

As will be appreciated, however, with increased reliance upon such satellite systems comes the need for high reliability. In turn, the provision of such reliability will depend upon the ability to rapidly service satellite systems via the ready replacement of disabled satellites within a given constellation. In addition to prompt response, the ability to achieve satellite replacement in a cost-effective manner is of obvious importance. For such purposes, it has been recognized that storage sites for launch vehicles (i.e., extraterrestrial vehicles utilized to position replacement satellites) will need to be geographically dispersed and otherwise designed for aesthetic and secure implementation.

In addition to data transfer satellite constellations, the use of launch vehicles to rapidly deploy tactical or emergency response satellites is of interest. By way of example, in the event of a crisis situation, the ability to quickly position an observation satellite, and thereby facilitate enhanced responsive action, is of potential particular interest.

Traditional systems for launching extraterrestrial vehicles are not well-suited for the noted needs. By way of example, traditional systems have employed a number of separate components for the storage, transport, erection, assembly and launching of extraterrestrial vehicles. Of particular example, permanent cranes, hydraulic lifts and other high-powered apparatus have been utilized for upending extraterrestrial vehicles from a reclined position to an inclined position for assembly and launch. Such apparatus are expensive and positionally-fixed in nature, typically under-utilized and do not accommodate dual use for transport, purposes or off-site assembly. In the later regard, traditional systems are typically limited in launch throughput since launch vehicles are assembled while positioned at a launch mount. As will be appreciated, the launch mount (e.g. flame ducts, umbilical mast, etc.) is typically the major cost component of a traditional launch site.

SUMMARY OF THE INVENTION

Accordingly, a primary objective of the present invention is to provide an effective system for rapidly and readily upending/reclining an extraterrestrial vehicle for assembly, transport, storage and/or launching purposes.

A further objective is to provide an improved upending/reclining system in a cost-effective and relatively easy-to-use manner.

An additional objective is to provide an improved upending/reclining system that can be readily integrated for use with traditional launch site systems so as to increase throughput and reduce launch costs.

Yet another objective of the present invention is to provide a system for handling extraterrestrial vehicles which utilizes inventive componentry for not only upending an extraterrestrial vehicle for launch, but additionally utilizes such componentry for upending/reclining a vehicle for assembly and storage at one or more remote sites and for transport of the vehicle between such sites and/or to a launch site in a convenient fashion.

These objectives and additional advantages can be realized utilizing an inventive apparatus which includes a support platform for supporting an extraterrestrial vehicle, and trunnion means, supported by the support platform, for pivotally positioning an extraterrestrial vehicle relative to the support platform. By virtue of the capability to pivotably handle an extraterrestrial vehicle, a vehicle may assume a reclined position on the support platform and be readily pivoted to an upended position that is transverse to the support platform for assembly and/or launch purposes. The vehicle may also be readily pivoted back to a reclined position on the support platform for transport and/or storage. To facilitate such pivotable positioning, the extraterrestrial vehicle may be interconnected to the trunnion means for pivotal movement about an axis located above the support platform.

The support platform preferably includes a u-shaped opening at one end (e.g., so as to define a fork-like configuration), with the trunnion means positioned adjacent thereto. By way of primary example, first and second trunnion supports may be mounted on the support platform on opposing sides of the u-shaped opening, wherein the bottom end of the extraterrestrial vehicle is downwardly pivotable through the opening. To support the bottom end of the extraterrestrial vehicle, a support member may be selectively interconnected to extend laterally away from the bottom end of the vehicle and supportably engage the ground or other support surface. More particularly, the support member may include at least one rotatable member such as a wheel for supportive, lateral movement on the ground or other support surface. In the latter regard, drive means may be included to selectively impart lateral movement to the support platform as well as the extraterrestrial vehicle and support member interconnected thereto. To accommodate such lateral movement the support platform may be mounted on wheels to effectively define a flat-bed carrier. Correspondingly, the drive means may include a motorized vehicle such as a truck tractor, and the support member may in essence define a fifth-wheel. Such an arrangement readily accommodates driven transport of an extraterrestrial vehicle from a storage location to a launch site.

To facilitate handling of the extraterrestrial vehicle, a bridge assembly may be directly connected to the extraterrestrial vehicle and provide for cooperative interface with the support platform, trunnion supports and support member. That is, such bridge assembly may be disposed on top of the platform for supportably receiving the extraterrestrial vehicle on the support platform in the reclined position, and for pivotal movement with the extraterrestrial vehicle during upending/reclining procedures.

By way of example, the bridge assembly may be of an open frame construction and include cradle means to matingly receive an extraterrestrial vehicle. Such cradle means may comprise two or more cradle members spaced to matingly engage the extraterrestrial vehicle. Since extraterrestrial vehicles generally have cylindrical outer surfaces, the cradle members may each define an arcuate outward-facing, support structure. The bridge assembly is preferably flat on the side opposite to the cradle members, thereby facilitating supportive interface with a top, flat surface of the support platform. One or more straps may be provided for selective positioning on the bridge assembly in opposing relation to the cradle members), thereby restricting movement of an extraterrestrial vehicle relative to the bridge assembly during upending/reclining procedures.

The bridge assembly may further include sidewardly projecting trunnions for pivotal interface with pivot interconnection means (e.g., pillow blocks) mounted on the trunnion supports. In this regard, the pivot interconnection means may be disposed on vertical lift members which may be extended/retracted into/out of pivotal engagement with the trunnions of the bridge assembly.

The bridge assembly may also include one or more support platforms spaced along the length thereof, such platforms provide access to the launch vehicle at one or more spaced elevations when the vehicle is upended, thereby facilitating assembly, access to conditioning systems, maintenance, etc.

To facilitate storage of an extraterrestrial vehicle (e.g. at a location remote from a launch assembly site), the bridge assembly may further comprise one or more selectively engageable storage support devices. Such devices may be employed to independently support the bridge assembly and extraterrestrial vehicle, thereby allowing the support platform to be utilized elsewhere. Such storage support devices may be in the form of kick-stand-like members and/or hydraulic, telescoping cylinder lifts. For example, such devices may be interconnected near one end of the bridge assembly and a support member as described above may be interconnected to the other end of the bridge assembly.

In such an arrangement, a bridge assembly and extraterrestrial vehicle supportably carried thereby may be horizontally positioned in a ground-based storage facility and the storage support device(s) pivoted and/or extended to supportably engage the ground or other support surface. Since the above-noted support member will also be in engagement with the support surface, the support platform may be laterally withdrawn away from the bridge assembly and extraterrestrial vehicle, e.g. by a motorized vehicle. Such horizontal storage capabilities free up the support platform and trunnion supports mounted thereto for use elsewhere. Additionally, this arrangement enhances the ability to address security and otherwise accommodates aesthetic interface with the area surrounding a storage facility.

When transport of the stored bridge assembly/extraterrestrial vehicle is desired, the support platform may again be readily positioned laterally under the bridge assembly. To facilitate such reengagement, as well as the withdrawal procedure noted above, the flat side of the cradle portion of the bridge assembly may include one or more rotatable members which extend downwardly when in the reclined position to rotatably engage the top surface of the support platform in a laterally progressive manner. As will be appreciated, such rotatable members may be spring-loaded to facilitate positioning of the support platform thereunder. After positioning of the support platform, the storage support devices may be pivoted or otherwise retracted to a transport position that may be conveniently nested within the bridge assembly.

For upending/reclining purposes, the inventive system may, in one arrangement, include a launch or assembly site having a suitable ground or other support surface, a launch pad recessed relative to the support surface, and a ramp extending between the support surface and recessed launch pad. Preferably, a portion of the upper support surface straddles the ramp, wherein the top end of the ramp smoothly adjoins the upper support surface and the ramp angles downwardly therefrom to the launch pad. When a support platform having a rearward u-shaped opening as described above is employed, the width of the rear-end portion of the support platform should exceed that of the ramp so that rear wheels on the support platform may rotatably engage the support surface on each side of the ramp, thereby permitting lateral movement of support platform in a first direction over the ramp. Corresponding with such lateral movement, a rotatable member mounted at the terminal end of the above-noted support member can engage and roll down the ramp. Concomitantly, the extraterrestrial vehicle will pivot about the pivot axis defined by the trunnion means and into an upended position. If desired, e.g. after assembly, the extraterrestrial vehicle may be readily reclined back onto the support platform by lateral movement of the support platform in a second direction, opposite to the first direction, whereby the support member will roll back up the ramp and the extraterrestrial vehicle will pivot in a controlled fashion back to the reclined position.

In another upending/reclining arrangement, the inventive system may include a launch or assembly site having a first support surface (e.g. at ground level), a second support surface elevated relative to the first support surface, a ramp extending between the first support surface and second support surface and a launch or assembly support pad positioned on the first support surface. Preferably, a portion of the first support surface extends through the ramp and elevated second support surface so as to provide an access path to the launch/support pad. In this regard, the width of the rear-end portion of the support platform should be sufficient so that the wheels on each side of the support platform may rotatably engage the ramp on each side of the access path of the first support surface, thereby permitting the support platform to straddle the access path and move in a lateral first direction up the ramp. Corresponding with such lateral movement, a rotatable member mounted at the terminal end of a support member as noted above can engage and roll along the access path. Concomitantly, the extraterrestrial vehicle will pivot about the pivot axis defined by the trunnion means into an upended position. In this regard, pivotal, upending movement of the extraterrestrial vehicle may be facilitated by the use of a winch assembly or the like (e.g. selectively interconnectable to the support platform to pull the platform up the ramp via a winding operation). If desired, e.g., after assembly, the extraterrestrial vehicle may be readily reclined back on to the support platform by lateral movement of the support platform in a second direction, opposite to the first direction, back down the ramp. Correspondingly, the support member will roll back along the access path of the first support surface. In this regard, the use of a winch assembly or the like will facilitate controlled pivotal movement of the extraterrestrial vehicle back to the reclined position (e.g. via a controlled unwinding operation).

To further facilitate positioning of the extraterrestrial vehicle on the launch pad or assembly support pad, and as noted above, the trunnion means may comprise pillow blocks or the like mounted on support members with via one or more vertical lift members (e.g. hydraulic telescoping lifts). Such lift members can serve to selectively, vertically extend so that the pillow blocks may selectively engage the trunnions of the bridge assembly to facilitate the noted pivotal translation of the extraterrestrial vehicle, then retract to lower the extraterrestrial vehicle on to the launch/support pad in a controlled manner. Additionally, guide means may be provided to facilitate positioning the extraterrestrial vehicle in the precise, predetermined launch location on the launch pad. By way of example, such guide means may include one or more tapered pins projecting upwardly from the launch/support pad and corresponding tapered recesses presented at the bottom of the bridge assembly.

As will be appreciated by those skilled in the art, the present invention comprises a simple and effective method for upending/reclining an extraterrestrial vehicle from a reclined/upended position to an upended/reclined position. Such method includes supporting a vehicle on a support platform in a reclined position, and pivoting the vehicle between an upended position and said reclined position, wherein the vehicle is pivotable relative to the support platform about a pivot axis that is supported by the support platform. The pivot axis may be advantageously located above the support platform and extend across a u-shaped opening in a rearward portion thereof.

In this regard, the pivoting step may include the supportably lowering a bottom end of the extraterrestrial vehicle and/or elevating said support platform, wherein the vehicle extends through the u-shaped opening when upended. The pivoting step may comprise laterally moving the pivot axis and support platform in tandem. In one arrangement, the method may include pivoting an extraterrestrial vehicle about a pivot axis located on one side of the center of gravity of an extraterrestrial vehicle and interconnected bridge assembly when in the reclined position. Such one side should include the top end of the extraterrestrial vehicle. In that regard, when the pivoting step includes the step of pivotally lowering the bottom end of the extraterrestrial vehicle, and thereby raising the top end, the method may advantageously utilize gravitational force as the prime mover to pivot the extraterrestrial vehicle about the pivot axis. When a support member is interconnected to support the extraterrestrial vehicle at the bottom end, the pivoting step may further include the substep of moving a terminal end of the support member laterally, or laterally and downwardly. Such terminal end may include a rotatable member which rolls across a support surface at a launch/assembly site.

Numerous extensions and additional advantages of the present invention will become apparent to those skilled in the art.

DESCRIPTION OF THE DRAWINGS

FIGS. 1A and 1B illustrate side and top views, respectively, of a support platform and trunnion supports in one embodiment of the present invention.

DETAILED DESCRIPTION

Figure 2A:
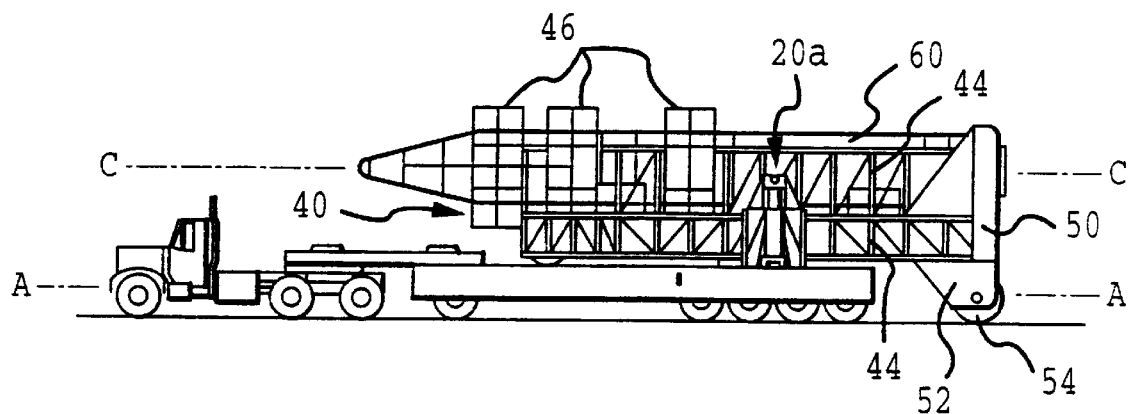
FIGS. 2A and 2B illustrate side and end views, respectively, of an extraterrestrial vehicle and interconnected bridge assembly positioned for transport utilizing the embodiment components of FIGS. 1A and 1B.

One embodiment of the present invention will now be described with reference to FIGS. 1–5. While FIGS. 1–5 and the accompanying description are presented in relation to a cylindrical, extraterrestrial launch vehicle of the type utilized for the positioning of satellites into earth-based orbits, it should be appreciated that the present invention can be readily employed in numerous other applications and is in no way limited thereto.

As best illustrated in FIGS. 1A and 1B, the described embodiment includes a support platform 10 having first and second trunnion supports 20a, 20b mounted in opposing relation thereupon. The first and second trunnion supports 20a, 20b each comprise a support frame 22a, 22b and hydraulic lift 24a, 24b supportably retained thereby. Each hydraulic lift 24a, 24b includes a bottom portion 26a, 26b supportably positioned on the top surface 12 of support platform 10, and a top portion 28a, 28b selectively extendable and retractable relative to bottom portion 26a, 26b. Top portions 28a, 28b each comprise a pivot interconnection means 30a, 30b (not shown) which together serve to pivotably support a launch vehicle therebetween during use.

More particularly, the first and second trunnion supports 20a, 20b support a pivot axis PA between their respective interconnection means 30a, 30b. Such pivot axis PA may be selectively raised/lowered via driven extension/retraction of top portions 28a, 28b, of lifts 24a, 24b most typically in tandem, relative to bottom portions 26a, 26b of lifts 24a, 24b By way of example, the above-noted interconnection means 30a, 30b may comprise pillow blocks having u-shaped openings for receiving trunnions therebetween. The legs of the u-shaped openings may be flared or angled outwardly, thereby facilitating the positioning of trunnions therein.

The support platform 10 includes a u-shaped opening 14 in a rear-end portion 16 thereof. The first and second trunnion supports 20a, 20b are positioned on opposing sides of and immediately adjacent to the u-shaped opening 14. A front-end portion 18 of support platform 10 tapers inwardly toward center axis AA from the rear-end portion 16. The front end portion 18 is interconnected via a mating bar 32 with a tractor-truck 34 for driven motion of support platform 10. In this regard, support platform 10 is provided with a plurality of spaced wheels 36 disposed on each side of the center axis AA of platform 10 and opening 14.

Figure 2B:
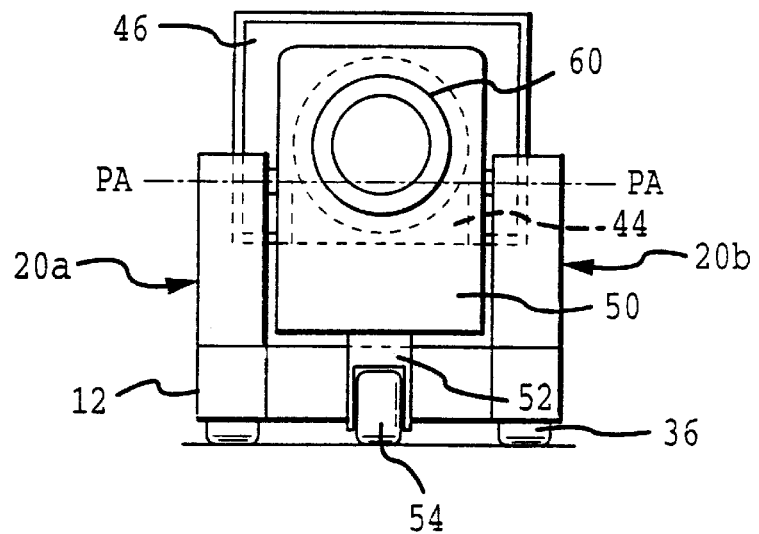

Referring now to FIGS. 2A–2B, the various components noted above with respect to FIGS. 1A and 1B are illustrated as employed for transport and interface with a bridge assembly 40 that supportably retains a cylindrical launch vehicle 60. Bridge assembly 40 is of an open frame construction and is directly connected to a support member 50 at a bottom or rearward end. Support member 50 includes a laterally extending toe portion 52 with one or more wheels 54 rotatably mounted thereto. Bridge assembly 40 includes two or more cradle members 44 for receipt of cylindrical launch vehicle 60, and sidewardly projecting trunnions (not shown) for receipt by and pivotal interface with the pivot interconnection means 30a, 30b (e.g., pillow blocks) of first and second trunnion supports 20a, 20b. In the later regard, pivotal interconnection on pivot axis PA is established on the top or forward side of the center of gravity of the launch vehicle 60 and interconnected bridge assembly 40 in the reclined position.

Bridge assembly 40 further includes selectively interconnectable straps (not shown) spaced along launch vehicle 60 for selective positioning around launch vehicle 60 so as to retain launch vehicle 60 between such straps and the frame of bridge assembly 40. Finally, bridge assembly may include a plurality of support platforms 46 for providing convenient access to extraterrestrial vehicle 60 at a plurality of spaced locations when extraterrestrial vehicle is in an upended position.

In the transport position illustrated in FIGS. 2A and 2B, the bottom or rear-end of bridge assembly 40 is supported by support member 50 via rolling engagement of therotatable member 54 on a support surface. Center axis CC of launch vehicle 60 is advantageously disposed substantially parallel to the longitudinal center axis of support platform AA for ease of vehicle handling and control during transport.

Figure 3A:
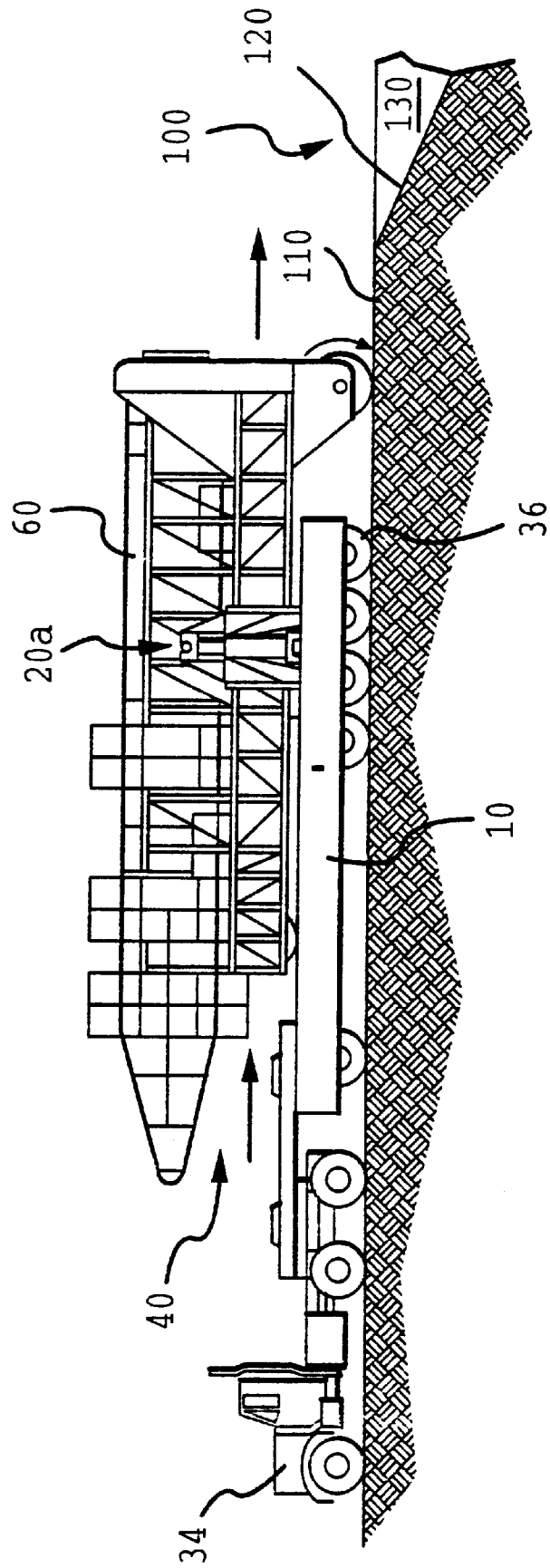
FIGS. 3A–3F are side-view illustrations showing progressive steps in one arrangement for upending the extraterrestrial vehicle and bridge assembly of FIGS. 2A and 2B at a launch or assembly site, utilizing the embodiment components of FIGS. 1A and 1B, wherein the site is shown in cross-section.
Figure 3B:
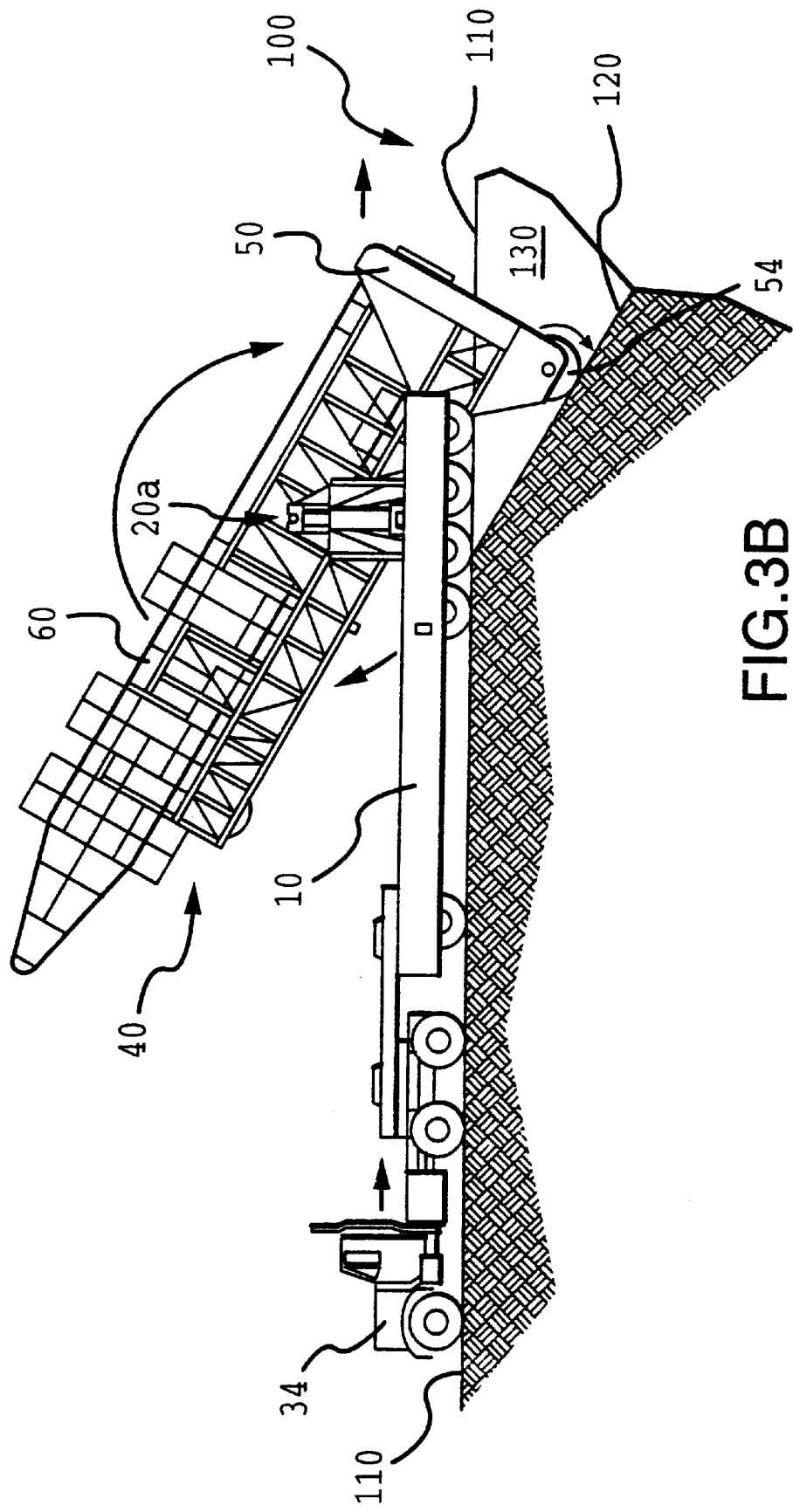
Figure 3C:
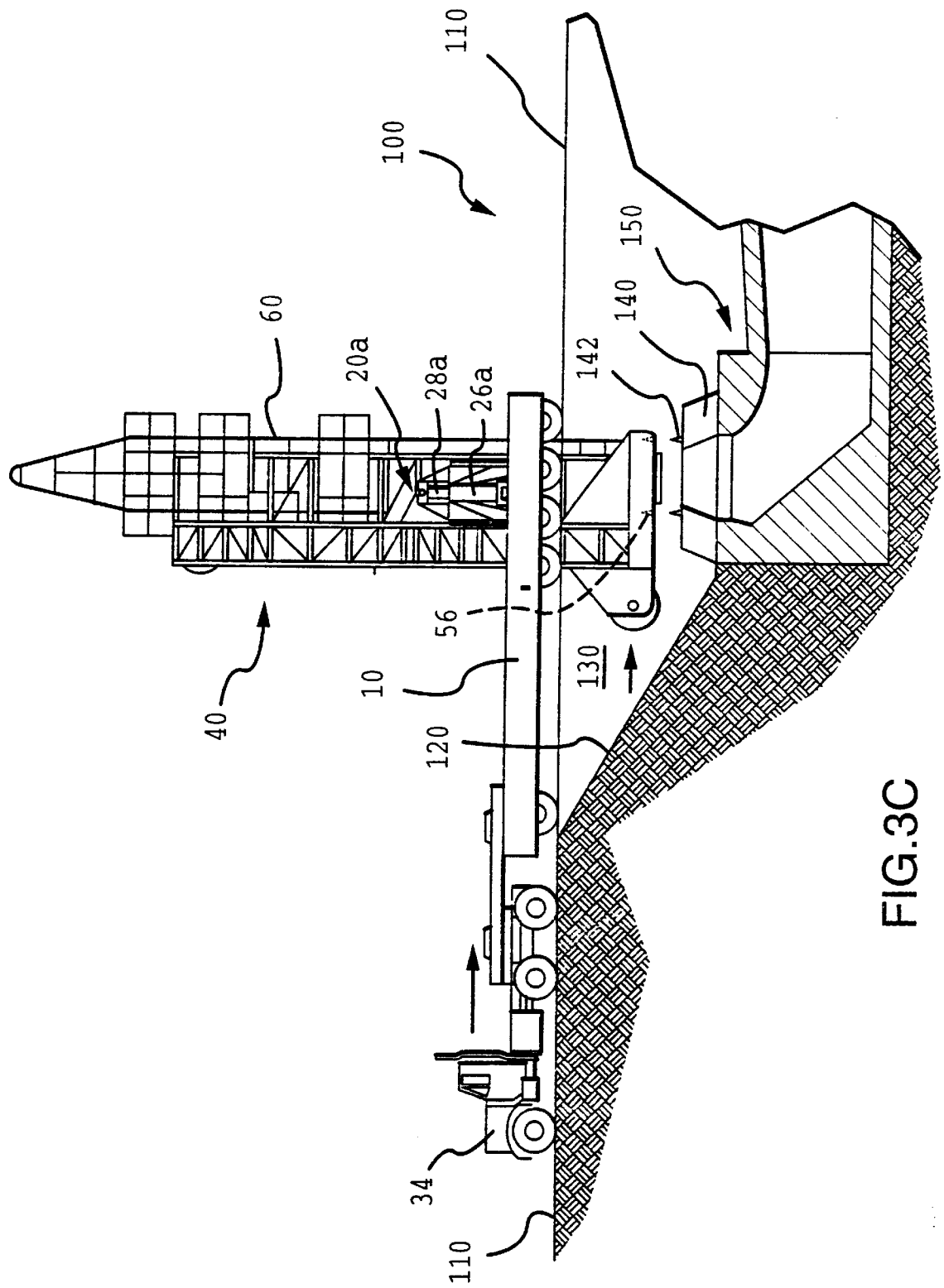

FIGS. 3A–3F illustrate upending/reclining procedures at a launch or assembly site 100. With specific reference to FIG. 3A, platform 10, and bridge assembly 40 and launch vehicle 60 supported thereby, are illustrated as they travel across a support surface 110 toward a ramp 120 pursuant to the rearward, driven movement of tractor-truck 34. Upon reaching the ramp 120, FIG. 3B illustrates how continued rearward movement of the tractor-truck 34 results in pivotal upending of the bridge assembly 40 and launch vehicle 60 supported thereby.

More particularly, it should be noted that ramp 120 declines from support surface 110 into a recessed region 130. Support surface 110 extends on both sides of the recessed region 130 to support the wheels 36 of platform 10. That is, the width of the recessed region 130 is less than the width of the wheel base defined by wheels 36 of the support platform 10. In this manner, support platform 10 will straddle the recessed region 130 during upending procedures. As shown in FIG. 3B, rotatable member 54 of support member 50 supportably engages and rolls downward along ramp 120 with rearward motion of support platform 10. In conjunction therewith, the bridge assembly 40 and launch vehicle 60 pivot about pivot axis PA under the influence of gravity. Such use of gravity in this embodiment is of particular advantage. To insure control over the pivotal motion of the extraterrestrial vehicle 60 and bridge assembly 40, the tractor-truck 34 may be provided with a redundant braking system.

Figure 3D:
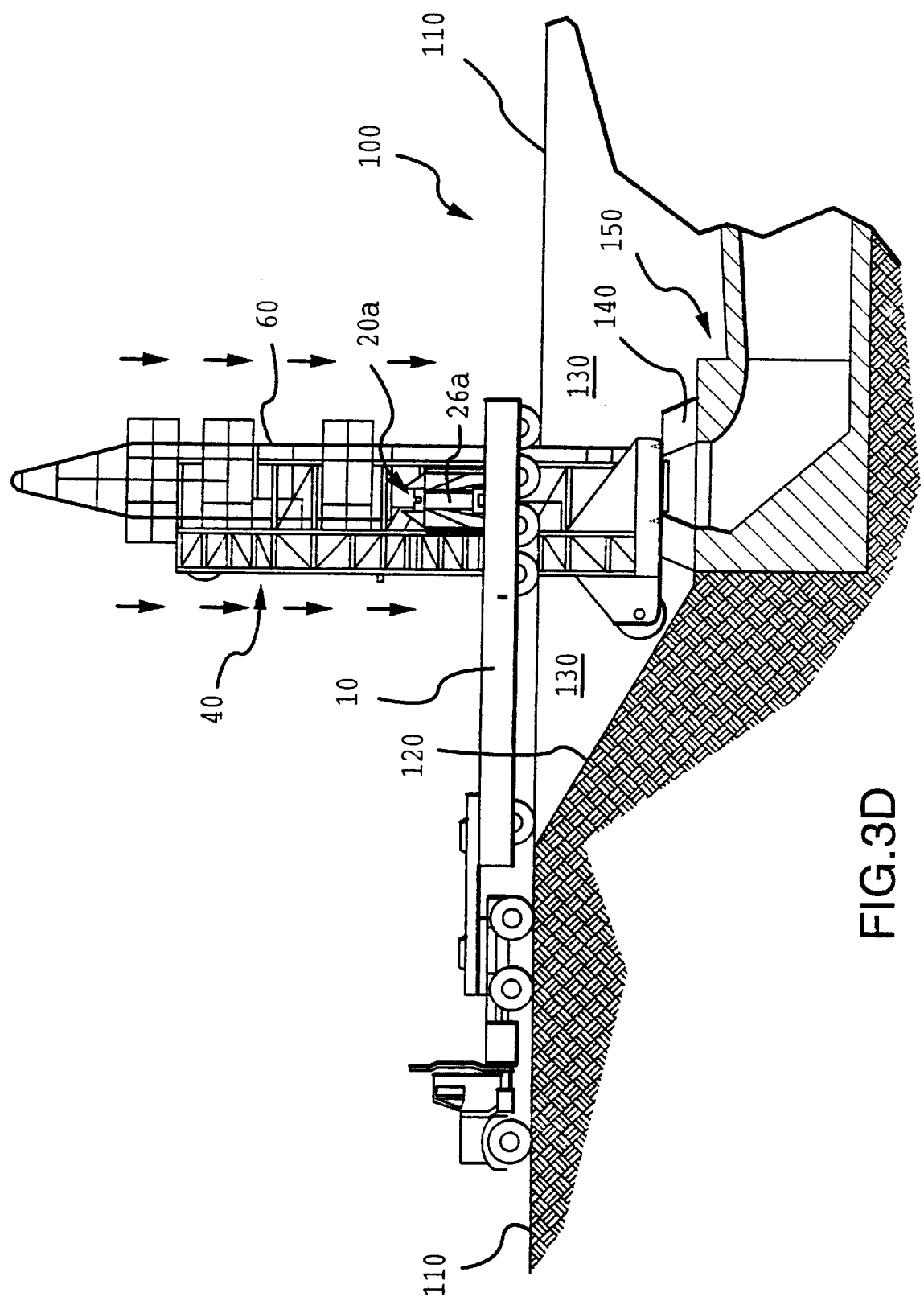

With continued rearward movement of truck-tractor 34 and support platform 10, the bridge assembly 40 and launch vehicle 60 will pivot to a totally upended position, which in the illustrated embodiment is substantially vertical. In a launch site application shown in FIGS. 3C–3F, the bottom end of launch vehicle 60 can then be laterally positioned to assume a location that is vertically spaced from the top of a launch pad 140 positioned in the bottom of recessed region 130. In this position, the vertical lift devices 24a, 24b of the first and second trunnions 20a, 20b may be utilized to lower the bridge assembly 40 and launch vehicle 60 downward into a precise, desired launch position on launch pad 140 as shown in FIG. 3D. In this regard, it can be seen that the upper portion 28a, 28b of the lift device(s) 24a, 24b is retracted from an extended position in FIG. 3C to a retracted position in FIG. 3D to achieve final disposition of the bridge assembly 40 and launch vehicle 60. To facilitate such final positioning, tapered, upwardly projecting pins 142 may be spaced about launch pad 142 and received by corresponding openings 56 in the bottom of support member 52. As further shown in FIG. 3D, launch pad 140 may be interconnected with an appropriate exhaust removal system 150 for receipt and redirection of the high-temperature exhaust of launch vehicle 60 upon launching.

Figure 3E:
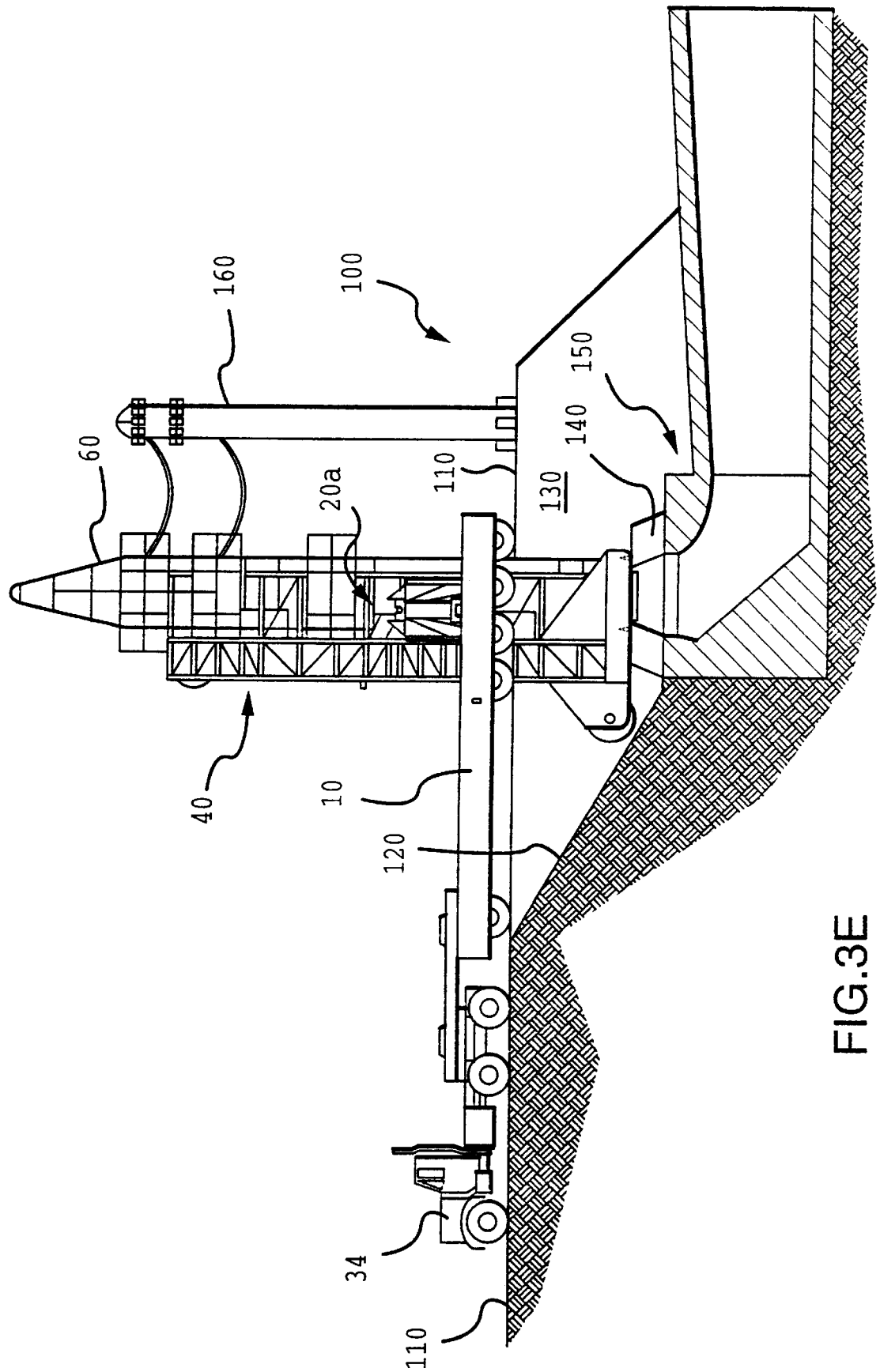

Bridge assembly 40 provides pre-launch access to launch vehicles at a plurality of different levels in its upright position via support platforms 46. In this regard, and as shown in FIG. 3E, the launch site may further include an umbilical mast 160 which can be utilized for selective interconnection to launch vehicle 60 in its upended position. The umbilical mast may comprise electrical, pneumatic and other conditioning system interfaces as will be appreciated by those skilled in the art.

Figure 3F:
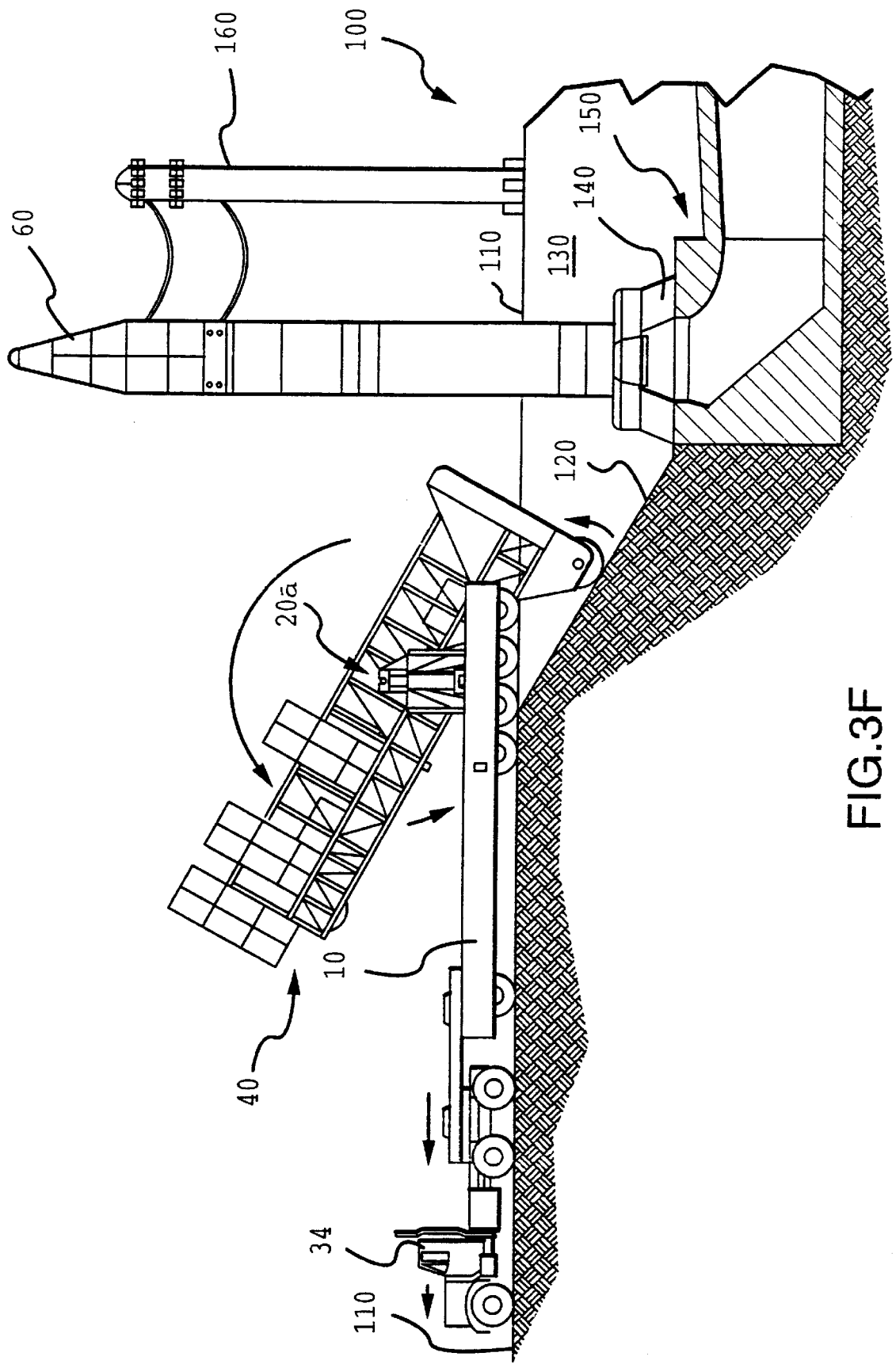

As shown in FIG. 3F, after launch vehicle 60 has been secured in its upright position on launch pad 140, the straps of bridge assembly 40 may be selectively disengaged from launch vehicle 60, and truck-tractor 34 may be driven forward, away from launch vehicle 60. Such forward motion results in pivotal motion of bridge assembly 40 about pivot axis PA and back into a support position on top surface 12 of support platform 10.

As noted, FIGS. 3C–3F illustrate a launch vehicle 60 being positioned upon a launch pad 140 for launching purposes. It should be appreciated that if, for any reason, a determination is made that the launch should not go forward, the launch vehicle 60 may remain interconnected to the bridge assembly 40, lifted from launch pad 140 and readily reclined back onto the top of support platform 10 pursuant to the driven motion of platform 12, as illustrated in FIG. 3F. More particularly, the top portions 26a, 26b of lifts 24a, 24b may be extended such that the interconnection means 30a, 30b engage the trunnions of bridge assembly 40 to lift launch vehicle 60. Subsequently, forward driven motion of tractor 34 will cause rotatable member 54 to roll up ramp 130, and the bridge assembly 40 with launch vehicle 60 interconnected thereto will controllably pivot back down onto the top of support platform 12.

An analogous procedure to that described above may be utilized to facilitate upright assembly of launch vehicle 60. In this regard, site 100 may simply be an assembly site wherein an assembly support pad is provided having tapered pins 56 for positioning a launch vehicle 60 thereupon for assembly procedures. As will be appreciated, the ability to readily upend/recline the launch vehicle for assembly provides numerous attendant advantages. By way of example, such a procedure could be utilized as opposed to current procedures which often entail the assembly of a launch vehicle at a launch site, thereby tying-up expensive launch pad resources and otherwise limiting launch throughput. Further, such a procedure allows for the provision of low-cost assembly/maintenance sites that can service launch vehicles stored at a plurality of storage sites, wherein a given launch vehicle may be transported one or more times to the assembly site for assembly and/or periodic maintenance, then readily transported to one of a plurality of storage facilities or a launch site.

Figure 4A:
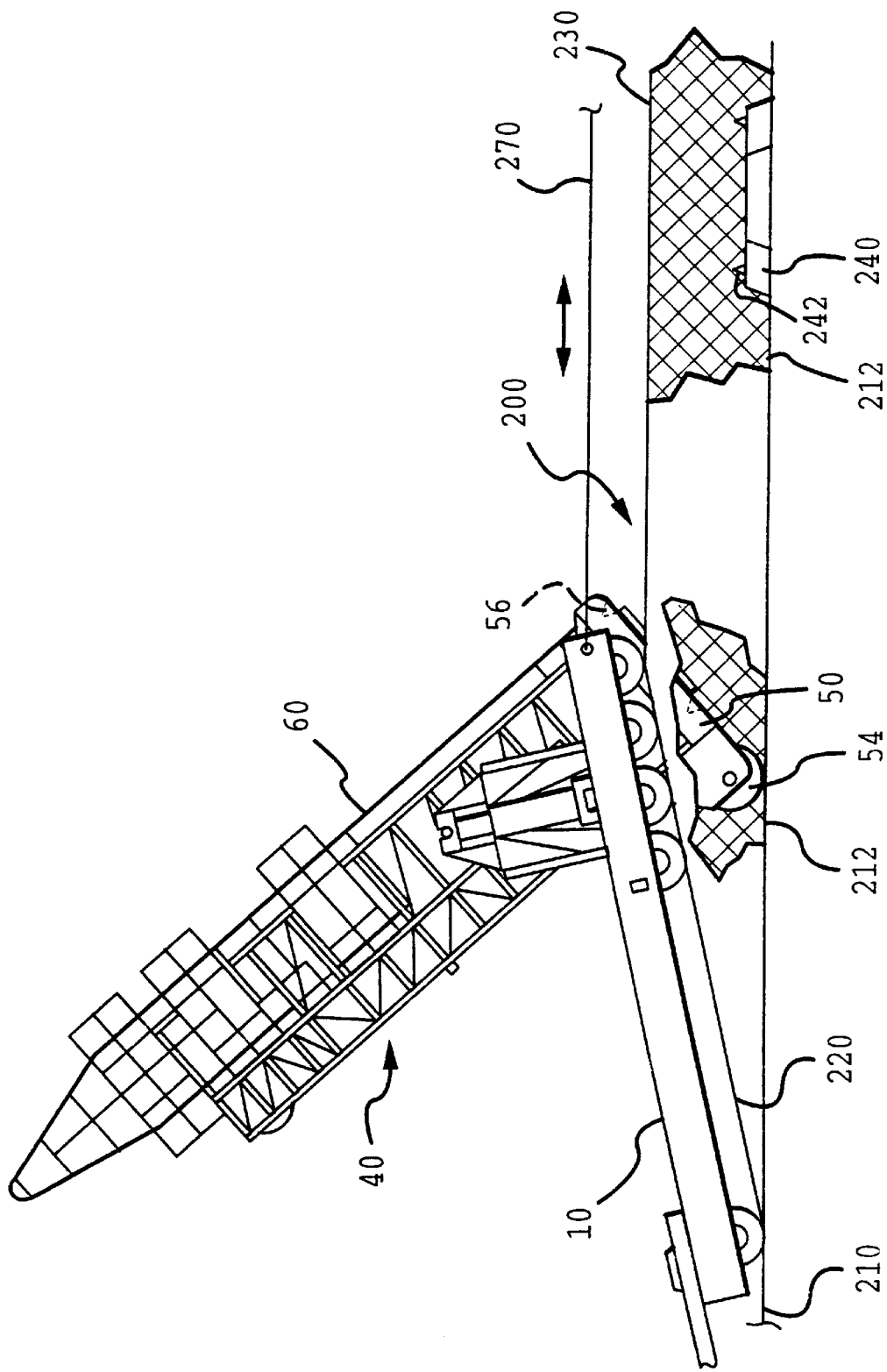
FIGS. 4A and 4B are side-view illustrations showing progressive steps in another arrangement for upending the extraterrestrial vehicle and bridge assembly of FIGS. 2A and 2B at a launch or assembly site, utilizing the embodiment components of FIGS. 1A and 1B, wherein the site is shown in partial cutaway, cross-section.
Figure 4B:
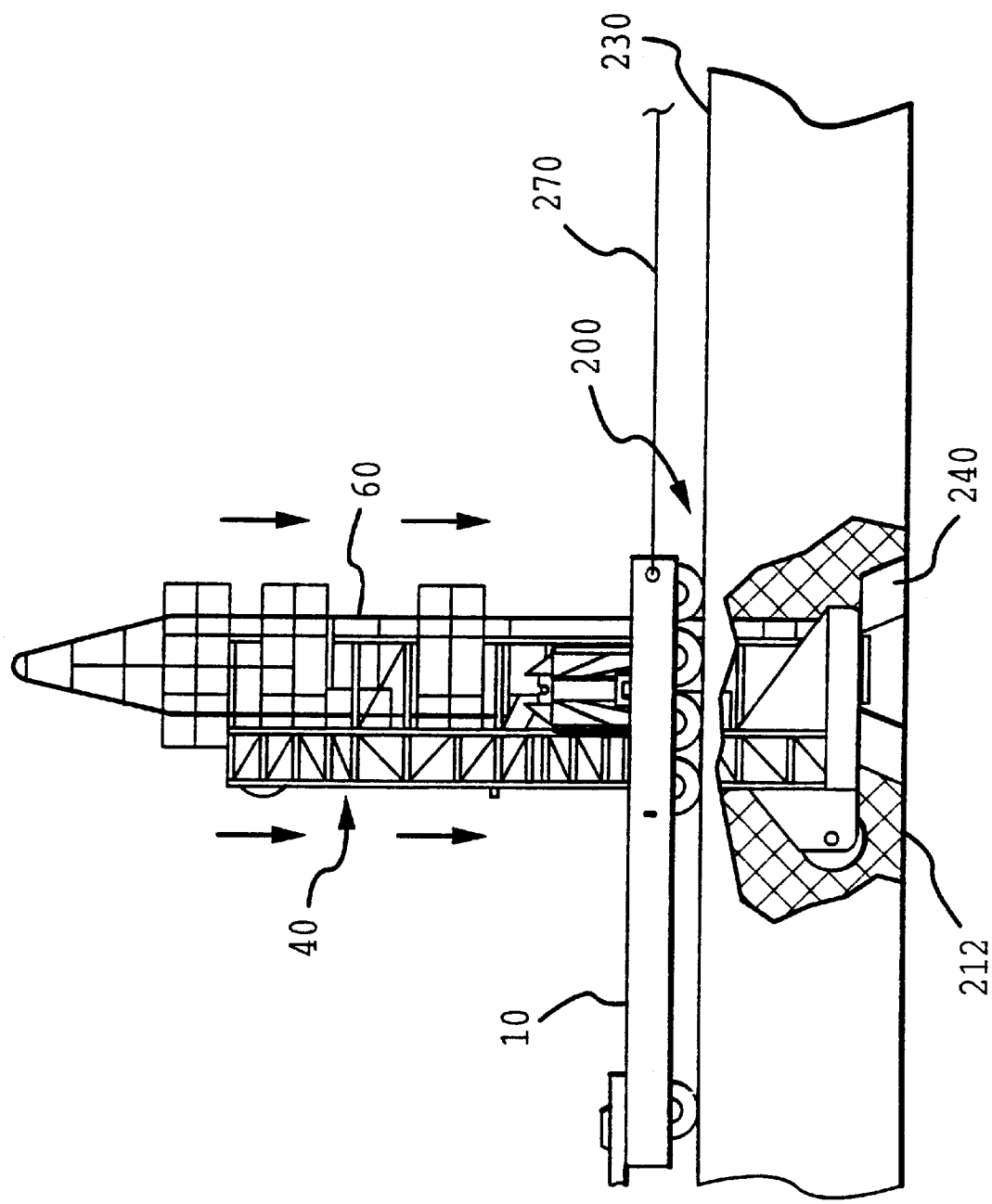

FIGS. 4A–4B illustrate another upending/reclining arrangement. More particularly, assembly or launch site 200 comprises a ground surface 210, elevated surface 230 and a ramp 220 extending therebetween. Ground surface 210 includes an access path 212 which extends through ramp 220 and into elevated surface 230 to provide access to a launch or support pad 240. As will be appreciated, access path 212 in essence bisects ramp 220 and elevated surface 230, wherein rotatable member 54 of support member 50 may engage and roll along the access path 212 during upending/reclining procedures.

In this regard, and as illustrated in FIGS. 4A and 4B, when support platform 10 is moved laterally toward pad 240, the support platform 10 will straddle the access path 212 and move upward on bisected ramp 220 to the top of the bisected elevated support surface 230. Concomitantly, as rotatable member 54 moves along access path 212 the bridge assembly 40 and launch vehicle 60 supported thereby will pivot to an upended position. To facilitate pivotal movement of bridge assembly 40, a winch cable 270 connected to a winch assembly (not shown) may be utilized to pull platform 10 up the ramp 220. As with the embodiment described in FIGS. 3A–3F, recesses 56 may be provided at the bottom of bridge assembly 40 for use with tapered pins 242 on pad 240 to position bridge assembly 60 on support/launch pad 240. Reclining procedures may be carried out in a fashion similar to that described above in relation to the arrangement of FIGS. 3A–3F. Again, the use of a winch cable 270 can facilitate such reclining procedure by insuring controlled movement of platform 10 and therefore bridge assembly 40/launch vehicle 60.

Figure 5A:
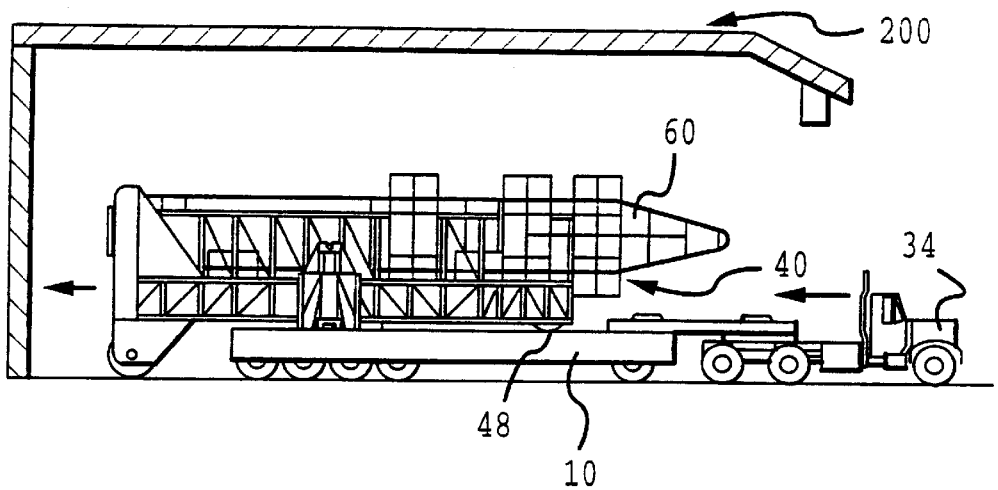
FIGS. 5A and 5B, and FIG. 5C illustrate side views and an end view, respectively, of the embodiment of FIGS. 1 and 2, as positionable for storage of the extraterrestrial vehicle and bridge assembly at a location remote from a launch and/or assembly site.
Figure 5B:
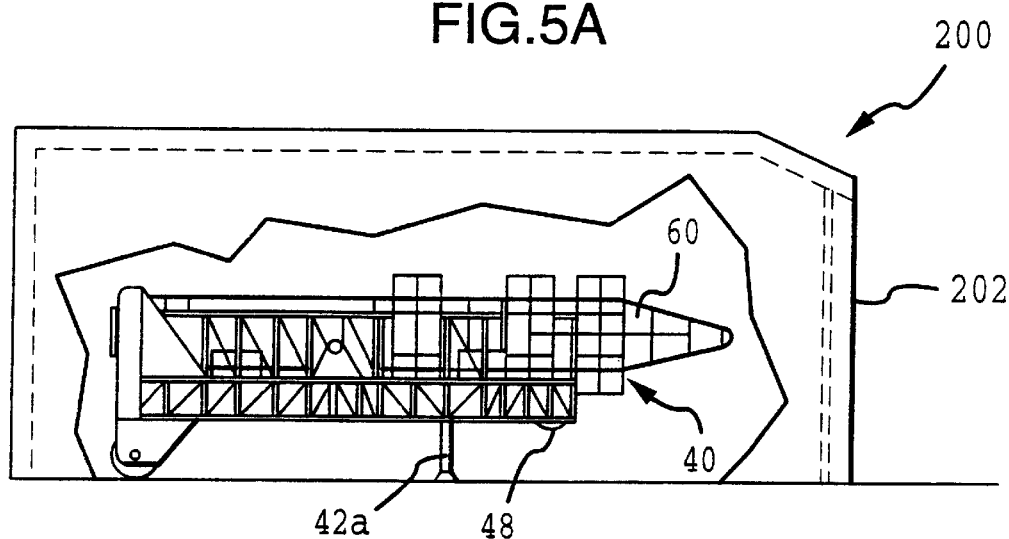
Figure 5C:
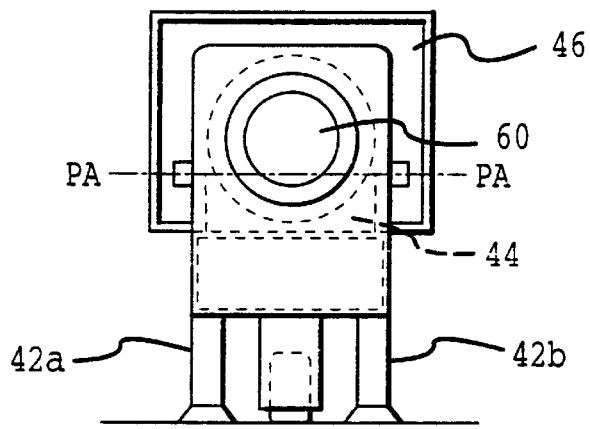

In addition to ready transport and upending of an extraterrestrial vehicle 60, the described embodiment also accommodates convenient storage of an extraterrestrial vehicle 60 for rapid deployment to a launch site 100. In this regard, FIGS. 5A–5C illustrate the positioning and storage of an extraterrestrial vehicle 60 and bridge assembly 40 interconnected thereto within a storage facility 200. As will be appreciated, numerous storage facilities 200 and launch sites 100 could be geographically dispersed in order to accommodate rapid deployment of a given launch vehicle 60/bridge assembly 40 to a given launch site 100. In this manner, for example, a disabled satellite in a satellite constellation could be rapidly replaced by a satellite carried by launch vehicle 60.

With particular reference to FIG. 5A, the embodiment described in relation to FIGS. 2A and 2B can be rearwardly positioned via truck-trailer 34 into the storage facility 200. Thereafter, and as shown in FIG. 5B jack-like devices 42a, 42b, interconnected on opposing sides of the bridge assembly 40 may be pivoted downward and extended to engage the support surface. In this position, the jack-like devices 42a, 42b serve to support the top or forward end of the bridge assembly 40 and launch vehicle 60, while the support member 50 supports the bottom or rearward end thereof. As such, support platform 10 may then be readily moved out from under bridge assembly 40 via driven, forward motion by truck-tractor 34. To facilitate such disengagement, the forward end of cradle portion 44 of bridge assembly 40 may be provided with one or more downwardly projecting wheels 48. Such wheels 48 may then serve to engage and roll across the top surface 12 of platform 10 as platform 10 is pulled away from the bridge assembly 40 and launch vehicle 60. After the truck-tractor 34 and platform 10 are disengaged, they can of course be driven to other locations for use while the bridge assembly 40 and launch vehicle 60 remain within storage facility 200. Storage facility 200 may be further provided with a door 202 for security purposes. When transport of the launch vehicle 60/bridge assembly 40 is desired, the platform may be readily backed into position thereunder, wherein wheels 48 on bridge assembly 40 facilitate reengagement. Thereafter jack-like devices can be retracted and pivoted to a rested position within bridge assembly 40 for transport therewith.

The described embodiment and arrangements have been presented to facilitate an understanding of the operation and advantages of the present invention. Numerous modifications and extensions will be apparent to those skilled in the art and are within the scope of the present invention as defined by the claims which follow.

What is claimed:

1. An apparatus for upending a launchable vehicle comprising:
   a moveable support platform for supporting a launchable vehicle;
   trunnion means, mounted to and supported by said support platform, for pivotally positioning a launchable vehicle relative to the support platform wherein a launchable vehicle is pivotable about a pivot axis defined by the trunnion means between a reclined position on said support platform and an upended position transverse to said support platform upon predetermined movement of the support platform.

2. An apparatus as recited in claim 1, said support platform having a u-shaped opening at one end thereof, and said trunnion means being positioned to define said pivot axis across the u-shaped opening, wherein a bottom end of a launchable vehicle is pivotable downwardly through the u-shaped opening to achieve said upended position.

3. An apparatus as recited in claim 2, wherein said pivot axis is located vertically above said support platform.

4. An apparatus as recited in claim 3, wherein said trunnion means comprises:
   means for selectively raising and lowering said pivot axis.

5. An apparatus as recited in claim 1, further comprising:
   a bridge assembly for selective, direct connection between a launch vehicle and said trunnion means, wherein said bridge assembly is pivotable together with a launchable vehicle between said reclined position and said upended position.

6. An apparatus as recited in claim 5, wherein said bridge assembly supports a launchable vehicle on said support platform in said reclined position and provides lateral access to a plurality of spaced locations along a launchable vehicle in said up-ended position.

7. An apparatus as recited in claim 5, wherein said bridge assembly comprises:
   at least one rotatable member projecting from one side for rotatably engaging a top surface of said support platform.

8. An apparatus as recited in claim 5, further comprising:
   a support member, interconnected to said bridge assembly and extending laterally away from said bridge assembly for supporting a bottom end of a launchable vehicle.

9. An apparatus as recited in claim 8, wherein said support member includes at least one rotatable member for rotatably contacting a support surface.

10. An apparatus as recited in claim 1, further comprising:
    drive means for driven lateral movement of said support platform.

11. An apparatus as recited in claim 10, said drive means including:
    a motorized vehicle for driven transport of said apparatus.

12. An apparatus as recited in claim 1, further comprising:
    a support member, a bottom end of a launchable vehicle on and in movable relation to a support surface.

13. An apparatus as recited in claim 1, wherein said trunnion means comprises:
   at least two trunnion supports mounted on top of said support platform.

14. A system for handling a launchable vehicle comprising:
   an upending site having upper and lower support surfaces, a support pad recessed relative to the upper support surface, and at least one ramp extending between said upper and lower support surfaces;
   an upending assembly including:
      a support platform for supporting a launch vehicle;
      trunnion means, supported by said support platform, for pivotally positioning a launchable vehicle; and
      a support member, selectively interconnectable at one end to extend laterally away from and support a bottom end of a launchable vehicle, and having a rotatable member at another end for rotatably engaging one of said ramp, upper support surface, and lower support surface at said site.

15. A system as recited in claim 14, further comprising:
   a bridge assembly for retaining and pivotal movement with a launchable vehicle.

16. A system as recited in claim 15, further comprising:
   guide means for positioning a bottom end of a launchable vehicle in a predetermined position on said support pad.

17. A system as recited in claim 16, said guide means comprising:
   at least one tapered guide pin interconnected to one of said support pad and said bridge assembly, and at least one receptacle for receiving said at least one tapered guide pin and being interconnected to the other of said support pad and bridge assembly.

18. A system as recited in claim 14, wherein said support platform includes a u-shaped opening at one end of the support platform, said one end of the support platform having a width greater than a width of said ramp.

19. A method for upending a launchable vehicle comprising:
   supporting a launchable vehicle on a movable support platform in a reclined position;
   pivoting a launchable vehicle between said reclined position and an upended position transverse to the support platform upon predetermined movement of the support platform, wherein the launchable vehicle is pivotable relative to the support platform about a pivot axis defined by a trunnion means, said trunnion means being mounted to and supported by the support platform.

20. A method as recited in claim 19, wherein said support platform includes a u-shaped opening in a rearward portion thereof, and wherein during said pivoting step a bottom end of a launchable vehicle extends through the u-shaped opening of said support platform in a transverse manner.

21. A method as recited in claim 19, said pivoting step including:
   laterally moving said pivot axis and said support platform in tandem.

22. A method as recited in claim 21, said pivoting step including:
   lowering said bottom end of a launchable vehicle relative to said support platform.

23. A method as recited in claim 21, said pivoting step including:
   elevating said support platform relative to said bottom end of a launchable vehicle.

24. A method as recited in claim 19, wherein said pivot axis is located above said support platform, and wherein said pivot axis is located on one side of a center of gravity of a launchable vehicle and a bridge assembly interconnected thereto when in the reclined position on top of said platform.

25. A method as recited in claim 19, wherein said trunnion means comprises:
   at least two trunnion supports mounted on top of said support platform.

* * * * *